US010165027B2

(12) United States Patent
Kang

(10) Patent No.: US 10,165,027 B2
(45) Date of Patent: Dec. 25, 2018

(54) APPARATUS AND METHOD FOR TRANSMITTING/RECEIVING BUFFERING DATA IN MEDIA STREAMING SERVICE

(71) Applicant: Samsung Electronics Co. Ltd., Suwon-si, Gyeonggi-do (KR)

(72) Inventor: Hyeon-Jin Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/039,547

(22) Filed: Sep. 27, 2013

(65) Prior Publication Data

US 2014/0095669 A1    Apr. 3, 2014

(30) Foreign Application Priority Data

Sep. 28, 2012  (KR) .................. 10-2012-0108784

(51) Int. Cl.
*H04L 29/06*     (2006.01)

(52) U.S. Cl.
CPC .......... *H04L 65/60* (2013.01); *H04L 65/4084* (2013.01); *H04L 65/80* (2013.01)

(58) Field of Classification Search
CPC ...... H04L 65/60; H04L 65/80; H04L 65/4084
See application file for complete search history.

(56) References Cited

U.S. PATENT DOCUMENTS

| 7,603,682 B1* | 10/2009 | Akiyama | H04H 20/82 725/139 |
| 2004/0234238 A1 | 11/2004 | Yoon et al. | |
| 2007/0156921 A1 | 7/2007 | Liu | |
| 2008/0256272 A1* | 10/2008 | Kampmann et al. | H04L 29/06027 |
| 2009/0199251 A1* | 8/2009 | Badoiu et al. | G06F 17/30867 |
| 2009/0240998 A1 | 9/2009 | Nikkila et al. | |
| 2009/0292819 A1* | 11/2009 | Kandekar et al. | H04N 7/17318 |
| 2010/0085943 A1 | 4/2010 | Reid et al. | |
| 2011/0161818 A1* | 6/2011 | Viljamaa | G11B 27/34 |
| 2011/0218658 A1 | 9/2011 | Goh et al. | |
| 2011/0270877 A1 | 11/2011 | Kim | |
| 2012/0166950 A1* | 6/2012 | Frumar | G06F 3/04883 715/719 |
| 2012/0297009 A1* | 11/2012 | Amir | H04L 12/66 709/213 |
| 2013/0018960 A1* | 1/2013 | Knysz et al. | H04L 65/403 |
| 2013/0111512 A1* | 5/2013 | Scellato | H04L 67/18 725/14 |

FOREIGN PATENT DOCUMENTS

| CN | 101110844 A | 1/2008 |
| JP | 2008-135825 A | 6/2008 |
| KR | 10-2009-0020540 A | 2/2009 |
| WO | 02/19720 A2 | 3/2002 |

\* cited by examiner

*Primary Examiner* — Chris Parry
*Assistant Examiner* — Soe M Hlaing
(74) *Attorney, Agent, or Firm* — Jefferson IP Law, LLP

(57) ABSTRACT

An apparatus and a method for operating a server providing a streaming service are provided. The method includes collecting statistical information regarding media generated by a plurality of users who reproduce the media, determining at least one preferred section of the media based on the statistical information, and transmitting media data regarding the preferred section of the media to User Equipment (UE) reproducing the media regardless of a currently reproduced point.

18 Claims, 13 Drawing Sheets

APPARATUS AND METHOD FOR TRANSMITTING/RECEIVING BUFFERING DATA IN MEDIA STREAMING SERVICE

CROSS-REFERENCE TO RELATED APPLICATION(S)

This application claims the benefit under 35 U.S.C. § 119(a) of a Korean patent application filed on Sep. 28, 2012 in the Korean Intellectual Property Office and assigned Serial No. 10-2012-0108784, the entire disclosure of which is hereby incorporated by reference.

TECHNICAL FIELD

The present disclosure relates to media streaming.

BACKGROUND

Streaming services enable a user to reproduce media, such as audio and video. During a streaming service, a currently received portion of media data may be reproduced even when the media data is not completely downloaded. Therefore, when compared to a method of reproducing download-completed media, streaming services save time during reproduction.

In providing a streaming service, the following functions are generally provided for a user's convenience. First, for swift reproduction of the media, an amount of media data may be buffered by a user side apparatus. This buffering denotes sufficiently receiving and storing media data in advance so that the media data is not all consumed at a user side apparatus during reproduction. Also, during streaming, total reproduction time may be divided by a fixed number, and one frame in each divided section may be provided as a preview thumbnail.

In performing the buffering, the buffered portion is determined using a point that is being currently reproduced as a reference. In other words, media data from a currently reproduced point up to a portion after a period of time are buffered. However, depending on a user's selection, the reproduction point may change instantaneously. For example, in the case where data are buffered for 5 seconds from a reproduction point, when a point of a moving picture corresponding to 1 minute 30 seconds is reproduced, data up to 1 minute 35 seconds will be buffered. When a user manipulates an interface, a reproduction section may be moved to a point of 3 minutes 20 seconds. That is, users using a video clip frequently drag a reproduction slide in search of a highlight portion of the video clip to view only the highlight portion without reproducing other sections of the video clip. This circumstance may often occur. In this case, only media data from 1 minute 30 seconds to 1 minute 35 seconds are buffered, and reproduction from the point of 3 minutes 20 seconds may be performed after a time delay. Also, in displaying the thumbnail, the thumbnail is generated from a frame of a position obtained by dividing an entire moving picture by an interval. That is, the thumbnail may not reflect the taste of the user.

As described above, additional functions for enabling a streaming service to be provided more effectively. That is, in providing buffering or a thumbnail, the above-described problems exist. More particularly, since the buffering method of the related art is not effective, it reduces the satisfaction of a user who uses the streaming service. Furthermore, a service provider provides unnecessary buffering for a portion of media not desired by the user, so that operation and network resources are wasted.

Therefore, a need exists for a method and apparatus providing a more convenient streaming service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for providing a more convenient streaming service.

Another aspect of the present disclosure is to provide an apparatus and a method for preventing unnecessary buffering in a streaming service.

Another aspect of the present disclosure is to provide an apparatus and a method for providing a buffering function that reflects a user's preference in a streaming service.

Another aspect of the present disclosure is to provide an apparatus and a method for determining a user's preference in a streaming service.

Another aspect of the present disclosure is to provide an apparatus and a method for providing a thumbnail that reflects a user's preference in a streaming service.

In accordance with an aspect of the present disclosure, a method for operating a server providing a streaming service is provided. The method includes collecting statistical information regarding media generated by a plurality of users who reproduce the media, determining at least one preferred section of the media based on the statistical information, and transmitting media data regarding the preferred section of the media to a User Equipment (UE) reproducing the media regardless of a currently reproduced point.

In accordance with another aspect of the present disclosure, a method for operating a UE for receiving a streaming service is provided. The method includes receiving media data regarding a preferred section of media regardless of a currently reproduced point in the media, and buffering the media data regarding the preferred section of the media, wherein the preferred section of the media is determined based on statistical information regarding the media generated by a plurality of users who generate the media.

In accordance with another aspect of the present disclosure, a server apparatus for providing a streaming service is provided. The server apparatus includes a controller configured to collect statistical information regarding media generated by a plurality of users who reproduce the media and to determine at least one preferred section of the media based on the statistical information, and a communication unit configured to transmit media data regarding the preferred section of the media to a UE reproducing the media regardless of a currently reproduced point.

In accordance with another aspect of the present disclosure, a UE for receiving a streaming service is provided. The UE includes a communication unit configured to receive media data regarding a preferred section of the media regardless of a currently reproduced point in media, and a controller configured to buffer the media data regarding the preferred section of the media, wherein the preferred section of the media is determined based on statistical information regarding the media generated by a plurality of users who generate the media.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a technology for providing a more convenient streaming service is described. More particularly, the present disclosure relates to an apparatus and method for transmitting, receiving and buffering data of a media streaming service and describes buffering data and thumbnail providing in a streaming service.

Figure 1:
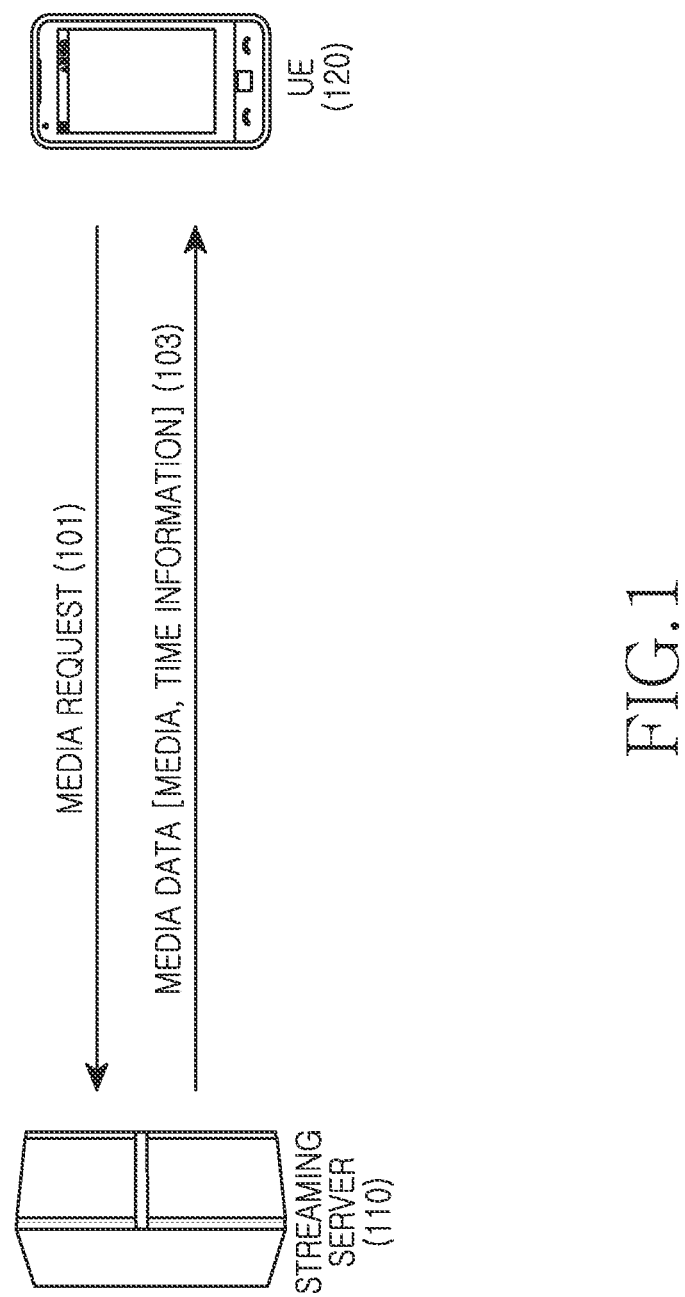
FIG. 1 is a view illustrating elements for a streaming service according to an embodiment of the present disclosure.

FIG. 1 is a view illustrating elements for a streaming service according to an embodiment of the present disclosure.

Referring to FIG. 1, a streaming server 110 provides streaming data, and User Equipment (UE) 120 reproduces media using the streaming data. Communication between the streaming server 110 and the UE 120 is performed via at least one network. In an embodiment, the at least one network may be one of a wired network and a wireless network, or a combination of the wired network and the wireless network. In the case where the network is the combination of the wired network and the wireless network, the UE 120 as a mobile terminal may access a mobile communication network via a Radio Frequency (RF) channel, and the mobile communication network may access a core network, thereby providing an Internet Protocol (IP) service to the UE 120. The UE 120 may be one of a smartphone, a portable terminal, a mobile phone, a mobile pad, a media player, a tablet computer, a handheld computer, a Personal Digital Assistant (PDA), a desktop computer, a laptop computer, or the like. Also, the UE 120 may be an apparatus that combines two or more functions of the above apparatuses.

Referring to FIG. 1, the UE 120 transmits a media request 101 to the streaming server 110. Accordingly, the streaming server 110 provides media data 103. In an embodiment, the media data 103 may include a media segment and time information of a segment. For transferring the media data, various protocols may be adopted. For example, a Dynamic Adaptive Streaming over HTTP (DASH) based on Hypertext Transfer Protocol (HTTP) may be applied.

The UE 120 buffers the media data 103. When a buffering state of the media data 103 meets a standard, the UE 120 reproduces the media by decoding and decompressing the media data 103. According to an embodiment of the present disclosure, the buffering is performed on not only a successive portion in time from a point being reproduced by the UE 120, but also on a portion determined as a preferred section. In other words, the streaming server 110 provides media data corresponding to not only a successive portion in time from a point being reproduced by the UE 120, but also on a portion determined as a preferred section.

Figure 2:
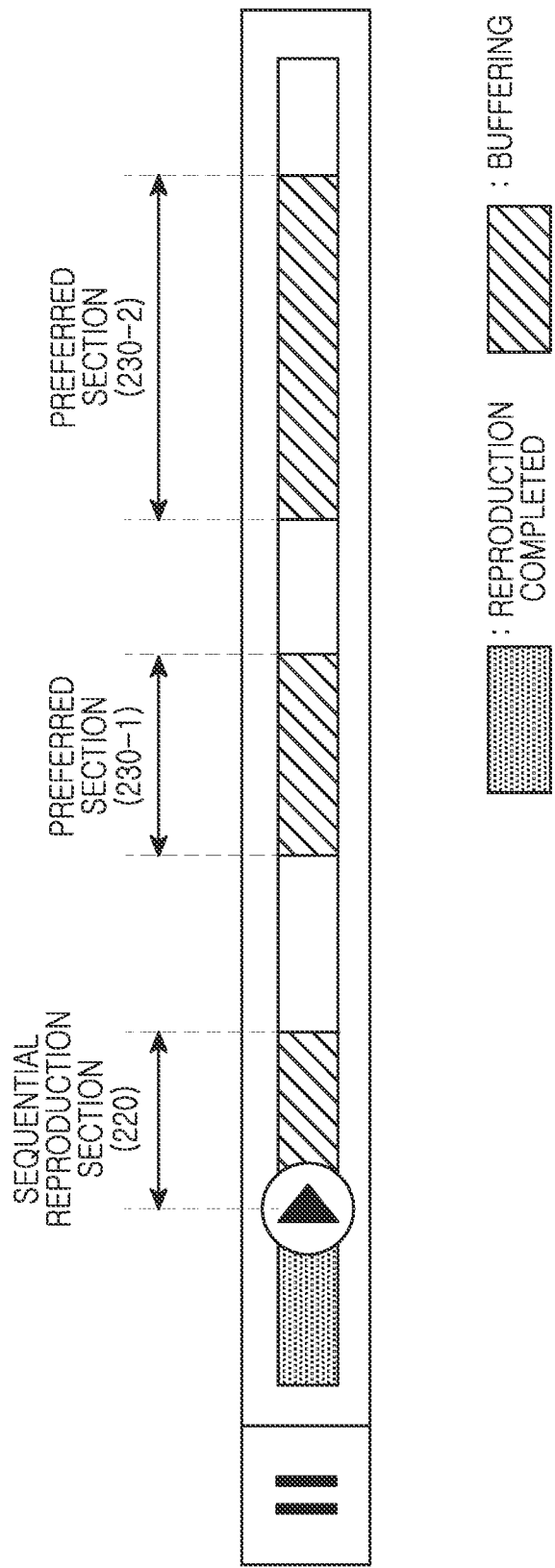
FIG. 2 is a view illustrating a buffering method in a streaming service according to an embodiment of the present disclosure.

An example of the buffering is illustrated in FIG. 2.

FIG. 2 is a view illustrating a buffering method in a streaming service according to an embodiment of the present disclosure.

Referring to FIG. 2, reproduction of a portion of a section has been completed, and a section 220 which is successive in time from a point being reproduced is buffered. For convenience, the present disclosure denotes the 'section 220 which is successive in time from the point being reproduced' by a 'sequential reproduction section 220'. In addition, buffering for a plurality of preferred sections 230-1 and 230-2 is also performed. The preferred sections 230-1 and 230-2 are fixed sections specified from among the entire media data. However, the sequential reproduction section 220 is not fixed but is a dynamic section determined with reference to a currently reproduced point. In an embodiment, when a user reproduces only a preferred section, unnecessary buffering for the rest of sections is not performed, and transmission of unnecessary data corresponding to about a half of a total reproduction amount may be prevented.

Data of a relevant section is transmitted by the streaming server 110 before reproduction, so that the buffering is performed. That is, for buffering of the preferred reproduction sections 230-1 and 230-2, the streaming server 110 should provide media data corresponding to the sequential reproduction section 220 and the preferred sections 230-1 and 230-2 in parallel. For the parallel buffering, the following specific data transmission methods may be applied.

For example, the streaming server 110 transmits data of the sequential reproduction section 220 with priority, and when a reserved buffer for the sequential reproduction section 220 is sufficient, the streaming server 110 transmits data corresponding to the preferred sections 230-1 and 230-2. In the case where a plurality of preferred sections exist as illustrated in FIG. 2, an order of priority may be determined from among the preferred sections according to a sequence. After that, in the case where buffering for the sequential reproduction section 220 is exhausted by a ratio, the streaming server 110 transmits data corresponding to the sequential reproduction section 220 again. For example, the ratio may be 50%.

In an embodiment, the streaming server 110 transmits data corresponding to the sequential reproduction section 220 and data corresponding to the preferred sections 230-1 and 230-2 simultaneously. For this purpose, the streaming server 110 may set a plurality of sessions. In this case, even though a plurality of preferred sections exist, the streaming server 110 may further set as many sessions as the number of the preferred sections, thereby simultaneously transferring data corresponding to all the preferred sections.

In an embodiment, the streaming server 110 transmits in turns data corresponding to the sequential reproduction section 220 and the data corresponding to the preferred sections 230-1 and 230-2. That is, when buffering for the sequential reproduction section 220 is completed by an amount, the streaming server 110 transmits data corresponding to the preferred sections 230-1 and 230-2, and when buffering for the preferred sections 230-1 and 230-2 is completed by an amount, the streaming server 110 transmits data corresponding to the sequential reproduction section 220.

Also, though not shown in FIG. 1, the streaming server 110 may further provide thumbnail data for media provided to the UE 120. In an embodiment, the thumbnail may be provided in the case where the media is a moving picture, and denotes a selectively displayed still image of a specific frame of the moving picture. Generally, since the thumbnail is used for the purpose of moving a reproduction point to a frame displayed by the thumbnail, it will meet user convenience to provide a thumbnail within a range where users usually reproduce media. Therefore, according to an embodiment of the present disclosure, the thumbnail may be selected based on the preferred sections 330-1 and 330-2 as illustrated in FIG. 3.

Figure 3:
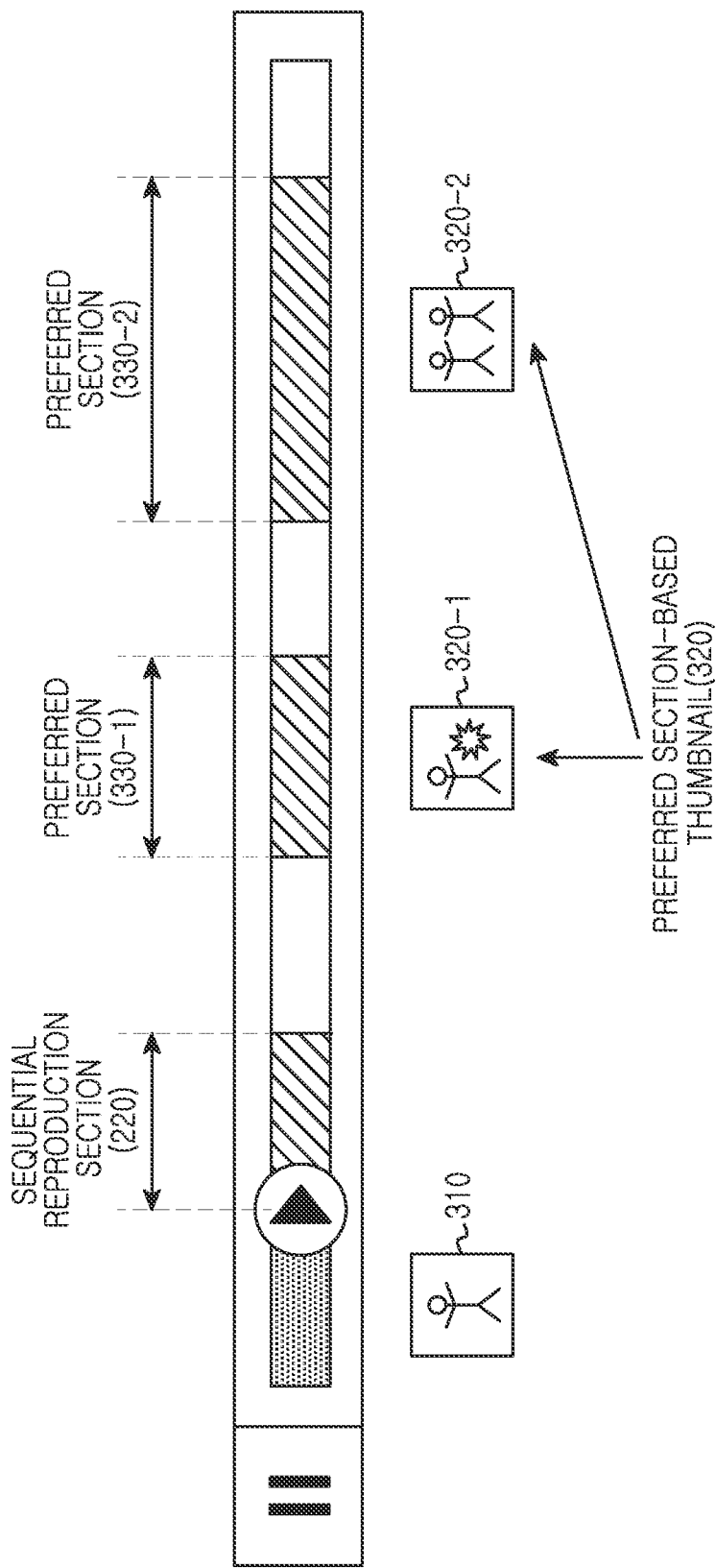
FIG. 3 is a view illustrating a thumbnail providing method in a streaming service according to an embodiment of the present disclosure.

FIG. 3 is a view illustrating a thumbnail providing method in a streaming service according to an embodiment of the present disclosure.

Referring to FIG. 3, thumbnails 320 (e.g., 320-1 and 320-2) are selected within the preferred sections 330-1 and 330-2 (e.g., preferred sections 230-1 and 230-2). Sequential reproduction section 320 may be, e.g., sequential reproduction section 220. The thumbnail selection based on the preferred sections 330-1 and 330-2 does not exclude another thumbnail selection method. That is, according to an embodiment of the present disclosure, another thumbnail 310 may be provided together besides the thumbnails 320 selected within the preferred sections 330-1 and 330-2. A specific example of thumbnail selection based on the preferred sections is illustrated in FIGS. 4 and 5.

Figure 4:
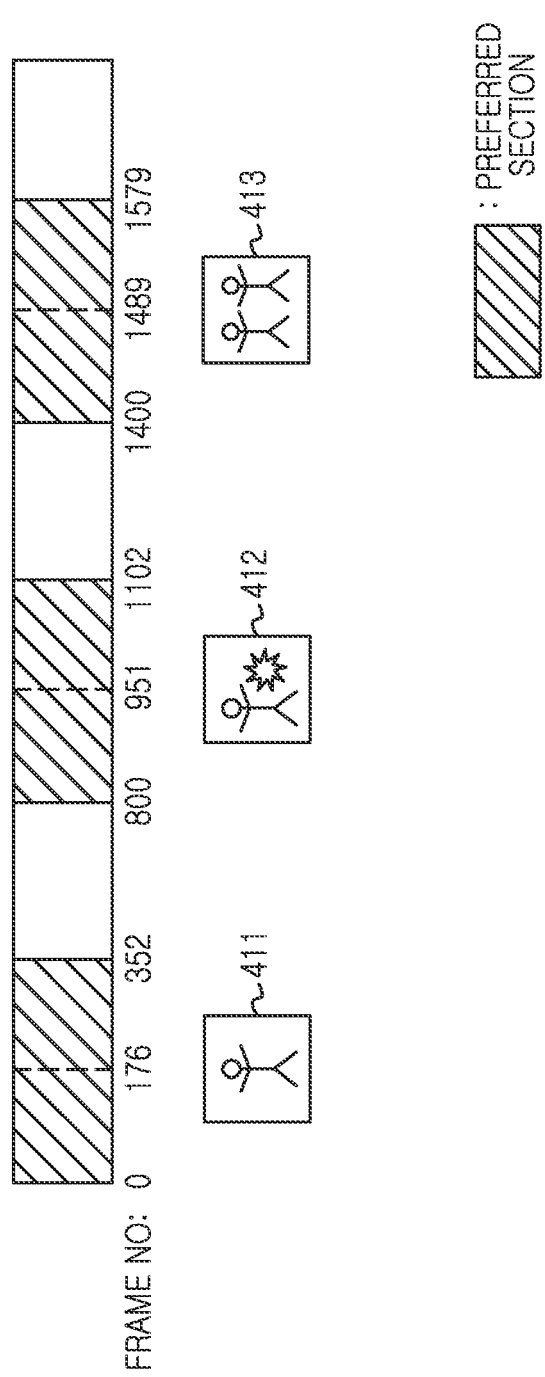
FIG. 4 is a view illustrating an example of thumbnail selection in a streaming service according to an embodiment of the present disclosure.

FIG. 4 is a view illustrating an example of thumbnail selection in a streaming service according to an embodiment of the present disclosure.

Referring to FIG. 4, frame Nos. 0 to 352, frame Nos. 800 to 1102, and frame Nos. 1400 to 1579 are preferred sections. In these respective preferred sections, one thumbnail is selected per preferred section. At this point, a frame for a thumbnail in each preferred section is selected according to a rule. For example, a frame at a half (½) point of each preferred section may be selected as a thumbnail. In this case, as illustrated in FIG. 4, a frame No. 176 (=0+(352−0)÷2) is selected as a thumbnail #1 (411), a frame No. 951 (=800+(1102−800)÷2) is selected as a thumbnail #2 (412), and a frame No. 1489 (=1400+(1579−1489)÷2) is selected as a thumbnail #3 (413).

Figure 5:
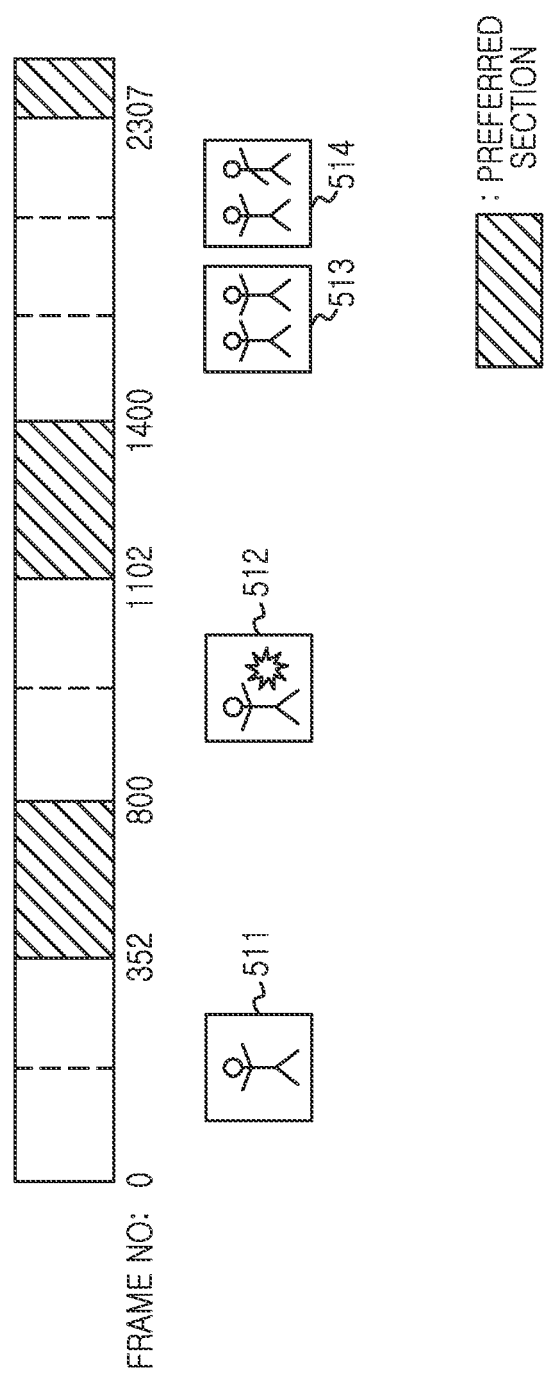
FIG. 5 is a view illustrating another example of thumbnail selection in a streaming service according to an embodiment of the present disclosure.

FIG. 5 is a view illustrating another example of thumbnail selection in a streaming service according to an embodiment of the present disclosure.

Referring to FIG. 5, frame Nos. 0 to 352, frame Nos. 800 to 1102, and frame Nos. 1400 to 2307 are preferred sections. In these respective preferred sections, at least one thumbnail is selected per preferred section. That is, the length of a selected thumbnail may change depending on the length of a preferred section. A relationship between the preferred section length and the number of thumbnails may be defined depending on a specific embodiment. In case of FIG. 5, two thumbnails 513 and 514 have been selected from a preferred section defined by frame Nos. 1400 to 2307. Thumbnail 512 has been selected from a section defied by frame Nos. 800 to 1102 and thumbnail 511 has been selected from a section defied by frame Nos. 0 to 352.

As described above, buffering and thumbnail selection according to an embodiment of the present disclosure are based on a preferred section. The preferred section may be determined depending on various methods. Since the preferred section reflects users' preference and taste, the preferred section may be based on statistical information collected from users. For example, the preferred section may be determined as in FIG. 6.

Figure 6:
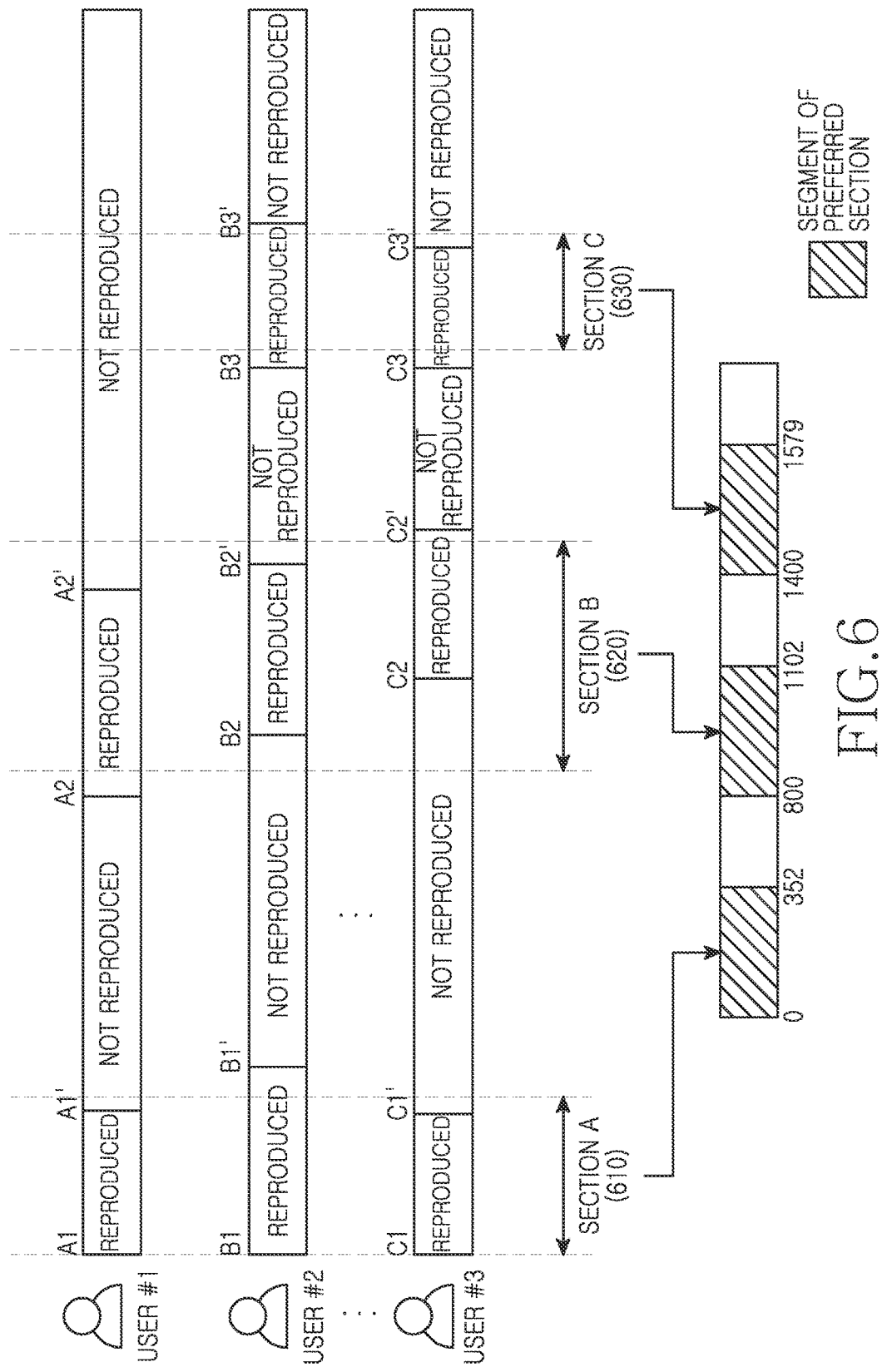
FIG. 6 is a view illustrating an example of preferred section determination in a streaming service according to an embodiment of the present disclosure.

FIG. 6 is a view illustrating an example of preferred section determination in a streaming service according to an embodiment of the present disclosure.

Referring to FIG. 6, the present disclosure denotes an 'object determining a preferred section' as a 'determination entity'. For example, the streaming server may be the determination entity.

Further referring to FIG. 6, the determination entity determines preferred sections based on reproduction results of a plurality of users who have received relevant media. For this purpose, first, a section reproduced by a user and a section not reproduced by a user should be identified. For example, reproduced sections and not-reproduced sections may be identified using a user's reproduction slide bar manipulation result. In an embodiment, a section from a point at which each user starts to drag the reproduction slide bar to a point at which each user releases the dragged reproduction slide bar may be determined as a reproduction-omitted section. Also, a section other than the reproduction-omitted section may be determined as a reproduced section.

When information regarding sections reproduced by respective users is collected, the determination entity determines a preferred section based on the reproduced sections. A specific determination process may change depending on a specific embodiment. For example, the determination entity may determine a section reproduced in common by users of a ratio or more from among a plurality of users as a preferred section. In an embodiment, the preferred section may be determined on a segment basis, on a frame basis, or on an I-frame basis. In the case of FIG. 6, with respect to a streaming media having a reproduction section of segments 0 to 1600 in total, a user #1 has reproduced two sections of A1 to A1' and A2 to A2', a user #2 has reproduced three sections of B1 to B1 ', B2 to B2 ', and B3 to B3 ', and a user #3 has reproduced three sections of C1 to C1 ', C2 to C2 ', and C3 to C3 '. Accordingly, the determination entity determines a section A 610 including a segment range of 0 to 352, a section B 620 including a segment range of 800 to 1102, and a section C 630 including a segment range of 1400 to 1579 as preferred sections.

In the above preferred section determination method, the preferred section is determined based on a user's reproduction section. However, according to an embodiment, a section selected or voted for by a user that is not a reproduction section may be basic material. That is, when a specific section is voted for by respective users though not reproduced, the voted section may be treated as a reproduced section and the above-described method may be applied in the same way. Also, according to an embodiment, a reproduced section and a voted section may be used together as basic materials. In the case where the voted section is used, a web page that provides streaming media may provide an interface for the vote.

As described above, the preferred section is determined based on statistical information regarding users' reproduction or vote. That is, according to an embodiment of the present disclosure, a streaming server may further provide additional information using the statistical information. For example, as illustrated in FIG. 7, the additional information may be provided together with a thumbnail.

Figure 7:
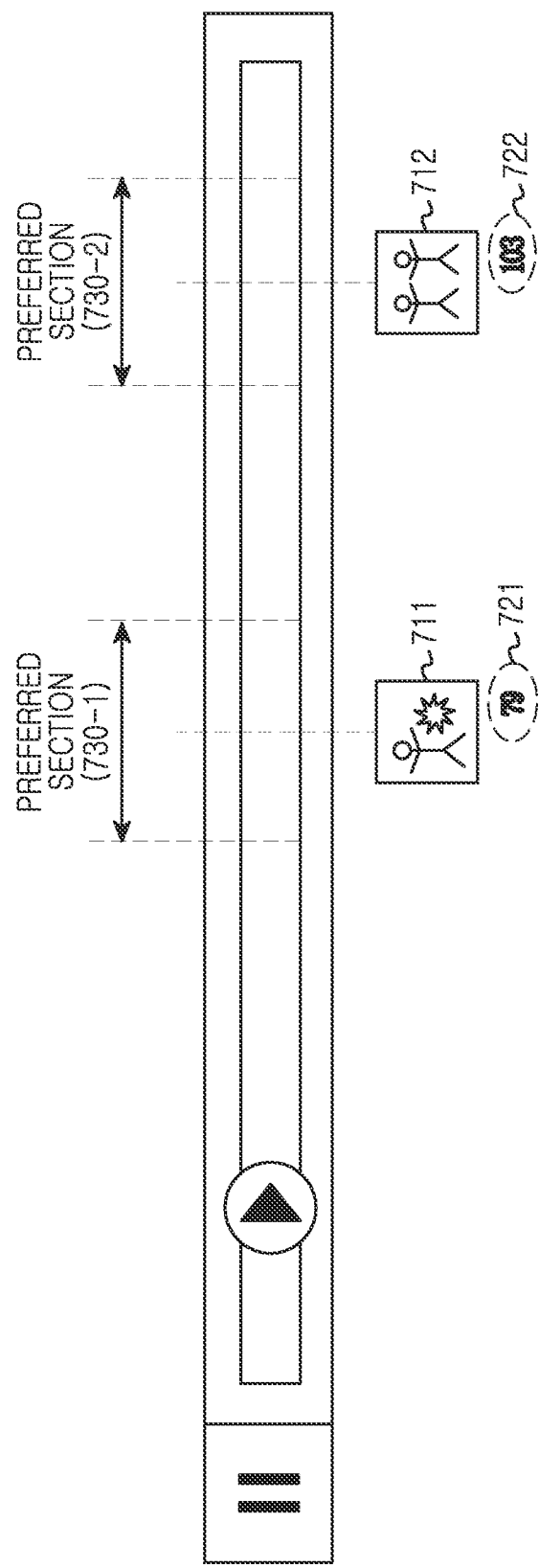
FIG. 7 is a view illustrating an example of thumbnail display including additional information in a streaming service according to an embodiment of the present disclosure.

FIG. 7 is a view illustrating an example of thumbnail display including additional information in a streaming service according to an embodiment of the present disclosure.

Referring to FIG. 7, two preferred sections are determined and two thumbnails 711 and 712 are selected from respective preferred sections 730-1 and 730-2 (e.g., preferred sections 230-1 and 230-2). Thumbnail data for the thumbnail is provided to the UE, and the UE displays the thumbnails 711 and 712 on the upper end or lower end of a slide bar. The thumbnail data includes at least one of a number, the position, and the thumbnail image of a corresponding frame.

According to an embodiment of the present disclosure, the thumbnail data includes statistical information regarding the preferred sections corresponding to the thumbnails 711 and 712 as additional information 721 and 722. Accordingly, the UE displays the statistical information including the additional information 721 and 722 together with the thumbnails 711 and 712. For example, the additional information 721 and 722 may be the number of times of reproduction of the preferred sections corresponding to the thumbnails 711 and 712. In the case of FIG. 7, the additional information 721 and 722 represent the number of times of reproduction. According to an embodiment of the present disclosure, the additional information 721 and 722 may represent other information except the number of times of reproduction. For example, the additional information 721 and 722 may be a reproduction frequency, a ratio of users who have reproduced a relevant preferred section to an entire statistical material collection group, or the like.

FIG. 7 illustrates an embodiment where the additional information 721 and 722 are displayed on the lower end of the thumbnails 711 and 712. However, according to an embodiment of the present disclosure, the additional information 721 and 722 may be displayed inside the thumbnails 711 and 712 or other external positions. According to an embodiment, the additional information 721 and 722 may be displayed only when a cursor is placed on the thumbnails 711 and 712.

Hereinafter, a streaming server providing a streaming service as described above, and an operation and a construction of UE for receiving the streaming service are described in detail with reference to the drawings.

Figure 8:
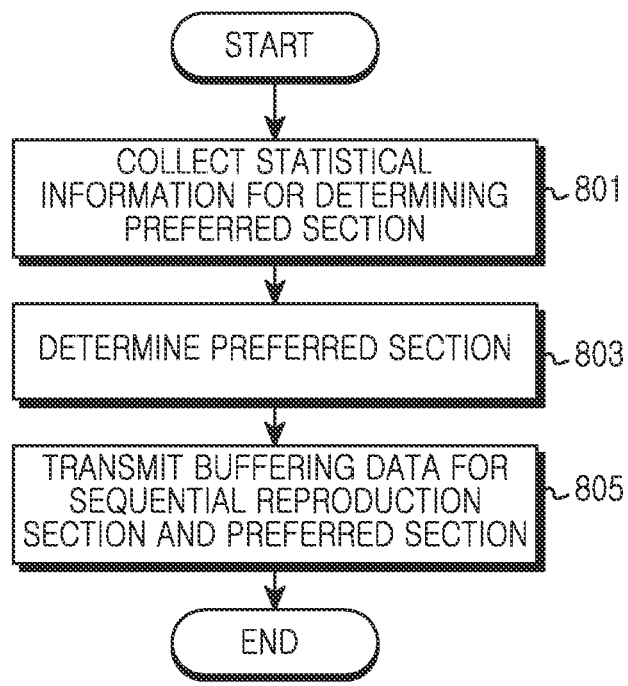
FIG. 8 is a flowchart illustrating a procedure for operating a streaming server in a streaming service according to an embodiment of the present disclosure.

FIG. 8 is a flowchart illustrating a procedure for operating a streaming server in a streaming service according to an embodiment of the present disclosure.

Referring to FIG. 8, the streaming server collects statistical information for determining a preferred section in operation 801. The statistical information is basic material for determining the preferred section, and denotes information indicating a section in which each user is interested from among the entire reproduction section of media. In other words, the statistical information is statistical material regarding the media, generated by a plurality of users who have reproduced the media. For example, the statistical information may include at least one of reproduction section information and vote information for specific media by a plurality of users. The reproduction section may be determined by a user's drag, a release, or the like, for a reproduction slide. Therefore, in case of collecting the reproduction section information, the streaming server collects information regarding manipulation of the slide bar or information directly indicating a reproduction section. The vote information is information indicating a specific section voted for by a user from among an entire reproduction section, and may be collected via an interface on a web page providing streaming media.

Subsequently, the streaming server proceeds to operation 803 to determine at least one preferred section based on the statistical information. For example, the streaming server may determine a section reproduced or voted in common by users of a ratio or more from among a plurality of users as a preferred section. In an embodiment, the preferred section may be determined on a segment basis, a frame basis, or an I-frame basis.

After that, the streaming server proceeds to operation 805 to transmit buffering data corresponding to a sequential reproduction section and a preferred section. That is, the streaming server supports buffering for the preferred section regardless of a current reproduction point so that UE may reproduce media without delay despite non-continuous reproduction point movement to a preferred section. For this purpose, the streaming server transmits data of the sequential reproduction section with priority, and when a reserved buffer for the sequential reproduction section meets a standard, the streaming server transmits data corresponding to the preferred section, and when buffering for the sequential reproduction section is exhausted by a ratio, the streaming server transmits data corresponding to the sequential reproduction section again. In an embodiment, the streaming server transmits data corresponding to the sequential reproduction section and data corresponding to the preferred section simultaneously via a plurality of sessions. In an embodiment, the streaming server transmits in turns data corresponding to the sequential reproduction section and data corresponding to the preferred sections.

Figure 9:
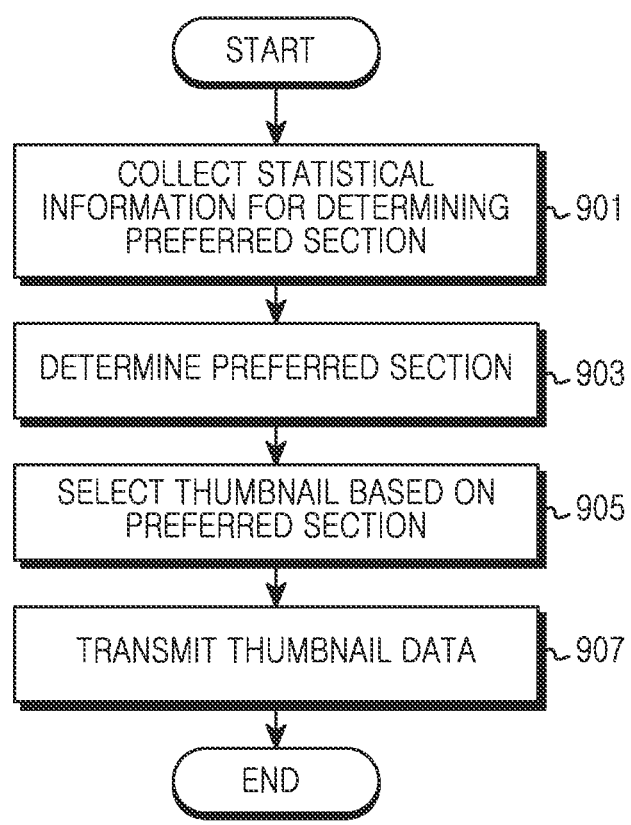
FIG. 9 is a flowchart illustrating a procedure for operating a streaming server in a streaming service according to an embodiment of the present disclosure.

FIG. 9 is a flowchart illustrating a procedure for operating a streaming server in a streaming service according to an embodiment of the present disclosure.

Referring to FIG. 9, the streaming server collects statistical information for determining a preferred section in operation 901. The statistical information is basic material for determining the preferred section, and denotes information indicating a section in which each user is interested from among the entire reproduction section of media. For example, the statistical information may include at least one of reproduction section information and vote information for specific media by a plurality of users. The reproduction section may be determined by a user's drag, a release, or the like, for a reproduction slide. Therefore, in the case of collecting the reproduction section information, the streaming server may collect information regarding manipulation of the slide bar or information directly indicating a reproduction section. The vote information is information indicating a specific section voted for by a user from among an entire reproduction section, and may be collected via an interface on a web page providing streaming media.

Subsequently, the streaming server proceeds to operation 903 to determine at least one preferred section based on the statistical information. For example, the streaming server may determine a section reproduced or voted in common by users of a ratio or more from among a plurality of users as a preferred section. In embodiments, the preferred section may be determined on a segment basis, a frame basis, or an I-frame basis.

After that, the streaming server proceeds to operation 905 to select at least one thumbnail based on the preferred section. The thumbnail denotes a selectively displayed still image of a specific frame of a moving picture. In other words, the streaming server selects at least one thumbnail within the at least one preferred section. In the case where a plurality of preferred sections exist, the streaming server selects at least one thumbnail per each preferred section. A frame for a thumbnail inside each preferred section is selected according to a rule. For example, one frame closest to a center portion of a preferred section may be selected as a thumbnail. The thumbnail may be selected from among all frames or I-frames.

Subsequently, the streaming server proceeds to operation 907 to transmit thumbnail data for the thumbnail. The thumbnail data is information enabling UE to display the selected thumbnail, and includes at least one of a number or the position of a frame selected as the thumbnail, and a thumbnail image. According to an embodiment of the present disclosure, the thumbnail data may include not only information regarding the thumbnail selected based on the preferred section in operation 905, but also information regarding a thumbnail selected by other methods. For example, the other methods include a method of selecting a thumbnail with an interval in the entire reproduction section. Furthermore, according to an embodiment of the present disclosure, in addition to the thumbnail data, the streaming server may further transmit additional information regarding the thumbnail. The additional information is generated from the statistical information collected in operation 901, and may include at least one of the number of times of reproduction, a reproduction frequency of a preferred section, and a ratio of users who have reproduced a relevant preferred section to an entire statistical material collection group.

Figure 10:
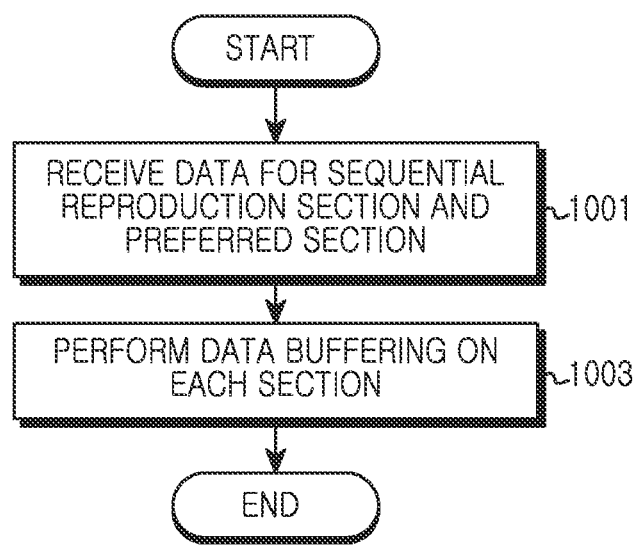
FIG. 10 is a flowchart illustrating a procedure for operating User Equipment (UE) in a streaming service according to an embodiment of the present disclosure.

FIG. 10 is a flowchart illustrating a procedure for operating UE in a streaming service according to an embodiment of the present disclosure.

Referring to FIG. 10, the UE receives data corresponding to a sequential reproduction section and data corresponding to a preferred section in operation 1001. The sequential reproduction section denotes a successive section from a point being reproduced. The preferred section denotes a specific section inside an entire reproduction section determined based on a statistical material for a plurality of users. The preferred section may be determined as a section reproduced or voted in common by users of a ratio or more from among a plurality of users. In an embodiment, the preferred section may be determined on a segment basis, a frame basis, or an I-frame basis. In an embodiment, the data corresponding to the sequential reproduction section and the data corresponding to the preferred section may be received in turns or simultaneously received via a plurality of sessions.

After that, the UE proceeds to operation 1003 to perform buffering on the data corresponding to the sequential reproduction section and the data corresponding to the preferred section. That is, the UE identifies on which position from among the entire reproduction section the data is located using time information included in the received data. Also, the UE generates a logical data space (ex: queue) for each section, and buffers relevant data in each data space. Simultaneously, the UE reproduces media by decoding and decompressing buffering data corresponding to the sequential reproduction section.

Figure 11:
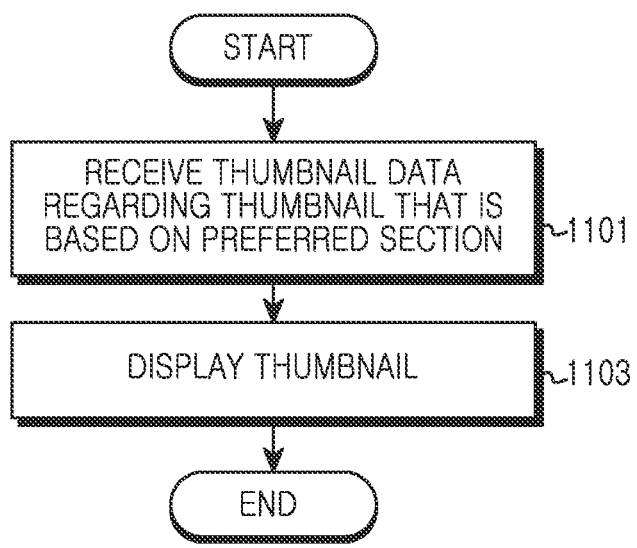
FIG. 11 is a flowchart illustrating a procedure for operating UE in a streaming service according to an embodiment of the present disclosure.

FIG. 11 is a flowchart illustrating a procedure for operating UE in a streaming service according to an embodiment of the present disclosure.

Referring to FIG. 11, the UE receives thumbnail data for a thumbnail that is based on a preferred section in operation 1101. The thumbnail denotes a selectively displayed still image of a specific frame of a moving picture. The thumbnail data received in operation 1101 indicates at least one thumbnail selected based on a preferred section. For example, one frame closest to a center point of a preferred section may be selected as a thumbnail. The thumbnail may be selected from among all frames or I-frames. The thumbnail data is information enabling UE to display the selected thumbnail, and includes at least one of a number or the position of a frame selected as the thumbnail, and a thumbnail image. According to an embodiment of the present disclosure, in addition to the thumbnail data, additional information for the thumbnail may be further received. The additional information is generated from statistical information collected for determining the preferred section, and may include at least one of the number of times of reproduction, a reproduction frequency of a preferred section, and a ratio of users who have reproduced a relevant preferred section to an entire statistical material collection group.

After that, the UE proceeds to operation 1103 to display a thumbnail using the thumbnail data. In other words, the UE reads the thumbnail data to extract information regarding the thumbnail, and display the thumbnail on the upper end or lower end of a slide bar. In the case where additional information is received in addition to the thumbnail data, the UE displays the additional information together with the corresponding thumbnail. The UE may display the additional information on the inside or outside of the corresponding thumbnail. According to an embodiment, the UE may display the additional information only when a cursor is placed on the thumbnail.

Figure 12:
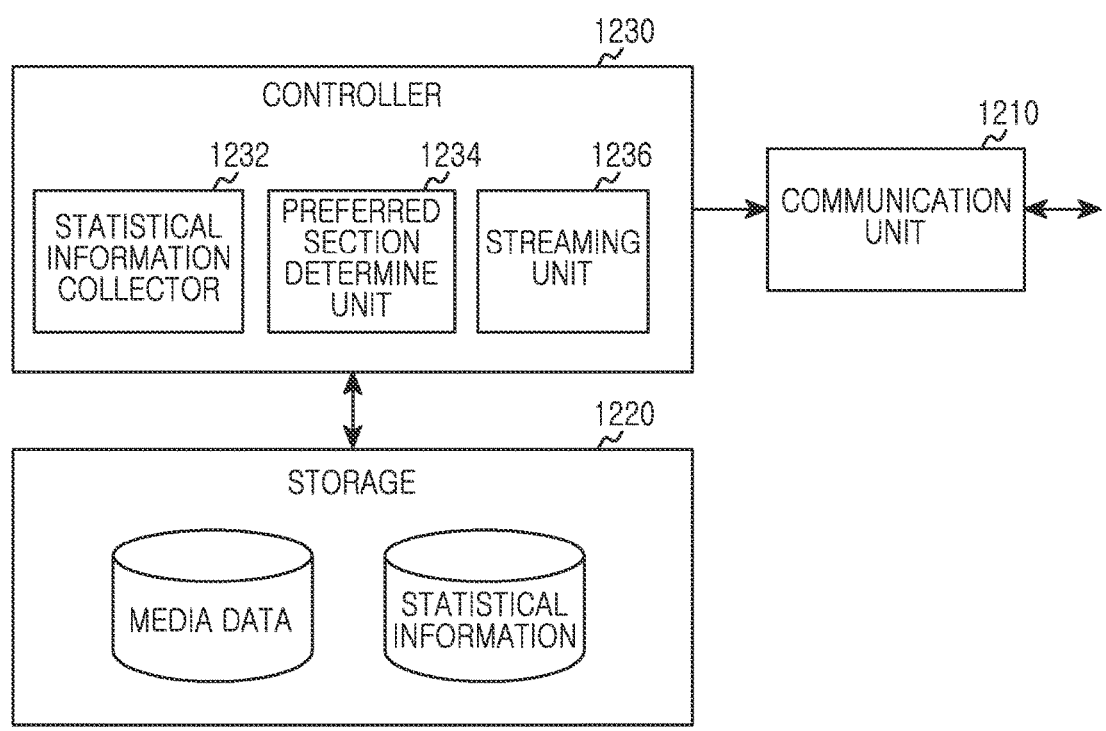
FIG. 12 is a block diagram illustrating a streaming server in a streaming service according to an embodiment of the present disclosure.

FIG. 12 is a block diagram illustrating a streaming server in a streaming service according to an embodiment of the present disclosure.

Referring to FIG. 12, the streaming server includes a communication unit 1210, a storage unit 1220, and a controller 1230.

The communication unit 1210 provides an interface for performing communication. That is, the communication unit 1210 converts a bit string transmitted from the streaming server to a physical signal, and converts a physical signal received from the streaming server to a bit string. For example, the communication unit 1210 receives a media request from UE and transmits media data, thumbnail data, or the like.

The storage unit 1220 stores a basic program for an operation of the streaming server, an application, and data, such as setting information, or the like. Also, the storage unit 1220 provides stored data according to a request of the controller 1230. According to an embodiment of the present disclosure, the storage unit 1220 stores media data to be provided via a streaming service, and statistical information collected from a plurality of users.

The controller 1230 controls an overall operation of the streaming server. For example, the controller 1230 transmits/receives a signal via the communication unit 1210. Also, the controller 1230 records/reads data to/from the storage unit 1220. According to an embodiment of the present disclosure, the controller 1230 includes a statistical information collector 1232 for collecting statistical information representing a section of specific media in which a plurality of users are interested, a preferred section determine unit 1234 for determining a preferred section of the specific media based on the statistical information, and a streaming unit 1236 for controlling to transmit media data according to a buffering policy determined depending on the preferred section. That is, the controller 1230 controls the streaming server to perform the procedures illustrated in FIGS. 8 and 9.

An operation of the controller 1230 for determining a preferred section according to an embodiment of the present disclosure is described below. The controller 1230 collects statistical information for determining a preferred section. In an embodiment, the statistical information may include at least one of reproduction section information and vote information for specific media by a plurality of users. In a case of collecting the reproduction section information, the controller 1230 collects information regarding manipulation information of the slide bar or information directly indicating a reproduction section. Also, the controller 1230 determines at least one preferred section based on the statistical information. For example, the controller 1230 may determine a section reproduced or voted in common by users of a ratio or more from among a plurality of users as a preferred section.

An operation of the controller 1230 for buffering according to an embodiment of the present disclosure is described below. The controller 1230 proceeds to transmit buffering data corresponding to a sequential reproduction section and a preferred section. In an embodiment, the controller 1230 transmits data of the sequential reproduction section with priority, and when a reserved buffer for the sequential reproduction section meets a standard, the controller 1230 transmits data corresponding to the preferred section, and when the buffering for the sequential reproduction section is exhausted by a ratio, the controller 1230 transmits data corresponding to the sequential reproduction section again. For another example, the controller 1230 simultaneously transmits data corresponding to the sequential reproduction section and data corresponding to the preferred section via a plurality of sessions. For another example, the controller 1230 transmits in turns data corresponding to the sequential reproduction section and data corresponding to the preferred section.

An operation of the controller 1230 for providing a thumbnail according to an embodiment of the present disclosure is described below. The controller 1230 selects at least one thumbnail within the at least one preferred section. When a plurality of preferred sections exist, the controller 1230 selects at least one thumbnail per each preferred section. A frame for a thumbnail inside each preferred section is selected according to a rule. For example, one frame closest to a center point of a preferred section may be selected as a thumbnail. Also, the controller 1230 transmits thumbnail data for the thumbnail. The thumbnail data includes at least one of a number or the position of a frame selected as a thumbnail, and a thumbnail image. According to an embodiment of the present disclosure, the thumbnail data may include not only information regarding a thumbnail selected based on the preferred section but also information regarding a thumbnail selected by other methods. Furthermore, according to an embodiment of the present disclosure, in addition to the thumbnail data, the controller 1230 may further transmit additional information for the thumbnail. The additional information is generated from the statistical information and may include at least one of the number of times of reproduction, a reproduction frequency of a preferred section, and a ratio of users who have reproduced a relevant preferred section to an entire statistical material collection group.

The present invention may be implemented in an electronic device including a portable terminal such as, for example, a smart phone and a mobile telecommunication terminal Hereunder, a UE is used as an example for the electronic device.

Figure 13:
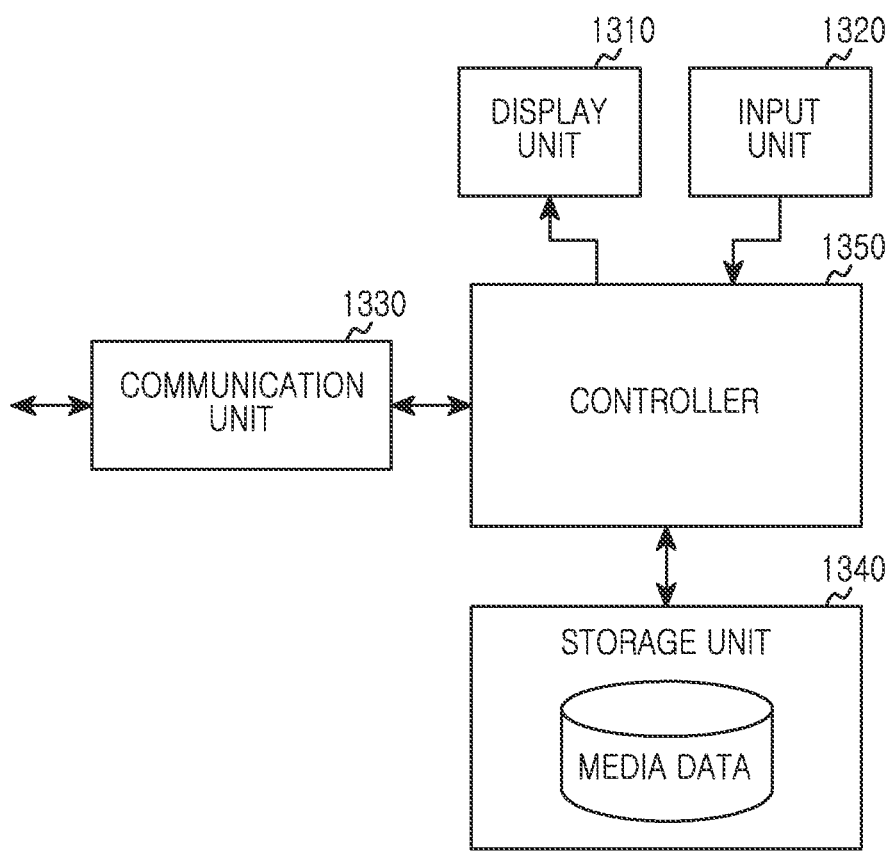
FIG. 13 is a block diagram illustrating UE in a streaming service according to an embodiment of the present disclosure.

FIG. 13 is a block diagram illustrating UE in a streaming service according to an embodiment of the present disclosure.

Referring to FIG. 13, the UE includes a display unit 1310, an input unit 1320, a communication unit 1330, a storage unit 1340, and a controller 1350.

The display unit 1310 displays state information occurring during an operation of the UE, numbers, characters, images, or the like, occurring during execution of an application. That is, the display unit 1310 may express image data provided from the controller 1350 such that the image data is visually recognizable. For example, the display unit 1310 may display media provided via a streaming service. The display unit 1310 may be a Liquid Crystal Display (LCD), a Light Emitting Diode (LED), a Laser Phosphor Display (LPD), an Organic Liquid Crystal Display (OLED), an Active Matrix Organic Liquid Crystal Display (AMOLED), a Flashing Light Emitting Diode (FLED), or the like.

The input unit 1320 recognizes an input generated by a user, and provides information corresponding to an input to the controller 1350. That is, the input unit 1320 processes a user's input via a keyboard, a keypad, a touchscreen, a touch pad, a mouse, a special function button, or the like. Though the display unit 1310 and the input unit 1320 are illustrated as separate blocks in FIG. 13, the display unit 1310 and the input unit 1320 may be configured as one means. In an embodiment, the display unit 1310 and the input unit 1320 may be configured as a touchscreen.

The communication unit 1330 provides an interface for performing communication. For example, depending on the purpose and device type of the UE, the communication unit 1330 includes at least one of a wireless interface and a wired interface. In a case of wireless interface, the communication unit 1330 may include a modem, a Radio Frequency (RF) processor, or the like.

The storage unit 1340 stores a basic program for an operation of the UE, an application, and data such as setting information, or the like. Also, the storage unit 1340 provides stored data according to a request of the controller 1350. According to an embodiment of the present disclosure, the storage unit 1340 stores, that is, buffers, media data provided via a streaming service.

The controller 1350 controls overall operations of the UE. For example, the controller 1350 transmits/receives a signal via the communication unit 1330. Also, the controller 1350 records/reads data to/from the storage unit 1340. According to an embodiment of the present disclosure, the controller 1350 controls to display a thumbnail selected based on a preferred section, and perform buffering on the preferred section. For example, the controller 1350 controls the UE to perform the procedure illustrated in FIGS. 10 and 11.

An operation of the controller 1350 for buffering according to an embodiment of the present disclosure is described below. When data corresponding to a sequential reproduction section and data corresponding to a preferred section are received, the controller 1350 performs buffering on the data corresponding to the sequential reproduction section and the data corresponding to the preferred section, respectively. That is, the controller 1350 identifies on which position from among the entire reproduction section the data is located using time information included in the received data. Also, the controller 1350 generates a logical data space (e.g., a queue) for each section in the storage unit 1340, and buffers relevant data in each data space.

An operation of the controller 1350 for displaying a thumbnail according to an embodiment of the present disclosure is described below. When thumbnail data is received, the controller 1350 displays a thumbnail via the display unit 1310 using the thumbnail data. In other words, the controller 1350 reads the thumbnail data to extract information regarding the thumbnail, and displays the thumbnail on the upper end or lower end of a slide bar. In the case where additional information is received in addition to the thumbnail data, the controller 1350 displays the additional information together with the corresponding thumbnail. The controller 1350 may display the additional information on the inside or outside of the thumbnail. According to an embodiment, the controller 1350 may display the additional information only when a cursor is placed on the thumbnail.

A streaming service may raise satisfaction of a user who uses the streaming service by providing buffering with consideration of a reproduction section preferred by users. Also, a streaming media provider may operate a service provide resource efficiently.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a server providing a streaming service, the method comprising:
   receiving statistical information regarding media generated by a plurality of users who reproduce the media;
   determining at least one first section of the media for a first buffer among a plurality of sections of the media, based on the statistical information;
   transmitting, to a terminal, first data corresponding to the determined at least one first section and thumbnail data for displaying at least one first thumbnail corresponding to the determined at least one first section, through at least one first session; and
   transmitting, to the terminal, second data corresponding to a second section of the media for a second buffer, through a second session that is different from the at least one first session,
   wherein the statistical information comprises information indicating a plurality of first sections of the media reproduced by the plurality of users,
   wherein the information indicating the plurality of first sections of the media is determined based on a manipulation of a slide bar for controlling the media,
   wherein the first buffer is a buffer for reproducing the media, regardless of a point at which the media is being reproduced,
   wherein the second buffer is a buffer associated with a point at which the media is being reproduced, wherein a number of the at least one first session is determined based on a number of the determined at least one first section, and wherein the thumbnail data comprises at least one image representing the determined at least one first section and a number of times of reproduction of the determined at least one first section.

2. The method of claim 1, wherein the manipulation of the slide bar comprises one or more of a user's drag for the slide bar or a user's release for the slide bar.

3. The method of claim 1, wherein the statistical information further comprises information indicating a plurality of second sections of the media selected by the plurality of users, and wherein determining at least one first section of the media comprises:

determining at least one section selected in common by users more than a designated number among the plurality of users as the at least one first section of the media.

4. The method of claim 1, wherein transmitting the first data and transmitting the second data are performed simultaneously or in a random order.

5. The method of claim 1, wherein transmitting the first data comprising:

if a buffered amount of the second data is greater than a threshold, transmitting the first data.

6. The method of claim 1, further comprising:

transmitting, to the terminal, information associated with a representative portion selected within the first data.

7. A method for operating a terminal receiving a streaming service, the method comprising:

reproducing media;

receiving, from a server, first data corresponding to at least one first section of the media for a first buffer and thumbnail data for displaying at least one first thumbnail corresponding to the at least one first section, through at least one first session, the thumbnail data comprising at least one image representing the determined at least one first section and a number of times of reproduction of the at least one first section;

receiving, from the server, second data corresponding to a second section of the media for a second buffer, through a second session that is different from the at least one first session;

displaying the at least one first thumbnail and the number of times of reproduction of the at least one first section; and displaying the first data in response to a user's input regarding the at least one first section of the media, wherein the at least one first section of the media is determined, among a plurality of sections of the media, based on statistical information regarding the media, wherein the statistical information is generated by a plurality of users who reproduce the media and comprises information indicating a plurality of first sections of the media reproduced by the plurality of users, wherein the information indicating the plurality of first sections of the media is determined based on a manipulation of a slide bar for controlling the media, wherein the first buffer is a buffer for reproducing the media, regardless of a point at which the media is being reproduced, wherein the second buffer is a buffer associated with a point at which the media is being reproduced, and wherein a number of the at least one first session is determined based on a number of the determined at least one first section.

8. The method of claim 7, wherein receiving the first data and receiving the second data are performed simultaneously or in a random order.

9. The method of claim 7, further comprising:

receiving, from the server, information associated with a representative portion selected within the first data; and displaying the representative portion.

10. An apparatus of a server providing a streaming service, the apparatus comprising:

a controller; and a communication unit operatively coupled to the controller, wherein the controller is configured to:

receive statistical information regarding media generated by a plurality of users who reproduce the media, determine at least one first section of the media for a first buffer among a plurality of sections of the media, based on the statistical information, transmit, to a terminal, first data corresponding to the determined at least one first section and thumbnail data for displaying at least one first thumbnail corresponding to the determined at least one first section, through at least one first session, and transmit, to the terminal second data corresponding to a second section of the media for a second buffer, through a second session that is different from the at least one first session, wherein the statistical information comprises information indicating a plurality of first sections of the media reproduced by the plurality of users, wherein the information indicating the plurality of first sections of the media is determined based on a manipulation of a slide bar for controlling the media, wherein the first buffer is a buffer for reproducing the media, regardless of a point at which the media is being reproduced, wherein the second buffer is a buffer associated with a point at which the media is being reproduced, wherein a number of the at least one first session is determined based on a number of the determined at least one first section, and wherein the thumbnail data comprises at least one image representing the determined at least one first section and a number of times of reproduction of the determined at least one first section.

11. The apparatus of claim 10, wherein the manipulation of the slide bar comprises one or more of a user's drag for the slide bar or a user's release for the slide bar.

12. The apparatus of claim 10, wherein the statistical information further comprises information indicating a plurality of second sections of the media selected by the plurality of users, and wherein the controller is configured to determine at least one section selected in common by users more than a designated number among the plurality of users as the at least one first section of the media.

13. The apparatus of claim 10, wherein the controller is further configured to transmit the first data and to transmit the second data simultaneously or in a random order.

14. The apparatus of claim 10, wherein the controller is further configured to transmit, if a buffered amount of the second data is greater than a threshold, the first data.

15. The apparatus of claim 10, wherein the controller is further configured to transmit, to the terminal, information associated with a representative portion selected within the first data.

16. An apparatus of a terminal receiving a streaming service, the apparatus comprising:

a controller;

a communication unit operatively coupled to the controller; and a display unit operatively coupled to the controller, wherein the controller is configured to:

reproduce media, receive, from a server, first data corresponding to at least one first section of the media for a first buffer and thumbnail data for displaying at least one first thumbnail corresponding to the at least one first section, through at least one first session, the thumbnail data comprising at least one image representing the determined at least one first section and a number of times of reproduction of the at least one first section, receive, from the server, second data corresponding to a second section of the media for a second buffer, through a second session that is different from the at least one first session, display the at least one first thumbnail and the number of times of reproduction of the at least one first section, and display the first data in response to a user's input regarding the at least one first section of the media, wherein the at least one first section of the media is determined, among a plurality of sections of the media, based on statistical information regarding the media, wherein the statistical information is generated by a plurality of users who reproduce the media and comprises information indicating a plurality of first sections of the media reproduced by the plurality of users, wherein the information indicating the plurality of first sections of the media is determined based on a manipulation of a slide bar for controlling the media, wherein the first buffer is a buffer for reproducing the media, regardless of a point at which the media is being reproduced, wherein the second buffer is a buffer associated with a point at which the media is being reproduced, and wherein a number of the at least one first session is determined based on a number of the determined at least one first section.

17. The apparatus of claim 16, wherein the controller is further configured to receive the first data and to receive the second data simultaneously or in a random order.

18. The apparatus of claim 16, wherein the controller is further configured to:

receive, from the server, information associated with a representative portion selected within the first data; and display the representative portion.

* * * * *